United States Patent [19]

Kvanta et al.

[11] Patent Number: 4,943,437
[45] Date of Patent: Jul. 24, 1990

[54] PROCESS FOR SUPPLY OF BIOLOGICALLY ACTIVE MATERIALS TO EASE MATERIALS

[75] Inventors: Endre Kvanta; Anders Pedersen; Lars Alexandersson, all of Ängelholm, Sweden

[73] Assignee: AB Medipharm, Ängelholm, Sweden

[21] Appl. No.: 38,936

[22] Filed: Apr. 6, 1987

[30] Foreign Application Priority Data

Apr. 7, 1986 [SE] Sweden ................................ 8601543

[51] Int. Cl.5 ............................................. A23K 1/165
[52] U.S. Cl. ....................................... 426/61; 426/72; 426/302; 426/311
[58] Field of Search ...................... 426/61, 72, 74, 311, 426/316, 531, 302, 63

[56] References Cited

U.S. PATENT DOCUMENTS

| | | | |
|---|---|---|---|
| 2,937,091 | 5/1960 | Rosenberg | 426/73 |
| 3,468,667 | 9/1969 | Chandler et al. | 426/99 |
| 3,617,299 | 11/1971 | Mattoon et al. | 426/99 |
| 3,617,302 | 11/1971 | Collins | 426/99 |
| 3,692,529 | 9/1972 | Rychman | 426/99 |
| 3,962,416 | 6/1976 | Katzen | 426/73 |
| 4,001,480 | 1/1977 | Shank | 426/61 |
| 4,208,433 | 6/1980 | Barham et al. | 426/69 |
| 4,725,443 | 2/1988 | Narushima et al. | 426/63 |

FOREIGN PATENT DOCUMENTS 1151669  5/1969  United Kingdom .

Primary Examiner—R. B. Penland
Attorney, Agent, or Firm—Ladas & Parry

[57] ABSTRACT

A process for supply of low concentrations of biologically active materials to base materials such as a processed foodstuff or an animal food, in which the biologically active material is slurried in an inert carrier, where it is insoluble, to form a homogeneous suspension, after which the suspension is applied to the base material by means of a device converting the suspension to an easily applicable form, the suspension coating the surface of the base material in an even layer. The suspension is maintained homogeneous by stirring and at an even temperature before being applied to the base material at such a rate than an even and predetermined concentration of the biologically active material is obtained per weight unit distributed on the surface of the base material.

12 Claims, No Drawings

PROCESS FOR SUPPLY OF BIOLOGICALLY ACTIVE MATERIALS TO EASE MATERIALS

BACKGROUND OF THE INVENTION

This invention relates to a process for supply of biologically active materials to base material, such as processed foodstuff and feed, and especially to such a process where low concentrations, preferably of the order of parts per million of biologically active materials are supplied to the base material.

It is known that ever more foodstuffs and feed are subjected to processes, by the purpose of which is to improve the nutrient properties, taste, structure, handling ability etc. of the foodstuff and feed. Most of these processes utilize heat, pressure, grinding and other physical working often in combination with supply of steam or another form of heat. Examples of such processes are rolling, steam boiling, extrusion, pelletizing etc.

For the purposes of this description the expression "base material" concerns foodstuffs and feed that have been subjected to the processes described above.

It is also known that certain sensitive nutrients such as vitamins, enzymes and recently also living bacteria which are intended to be supplied to a base material, do not withstand certain steps in the processes described above but are destroyed or, in any case, lose their so-called biopotency completely or partly.

One way of trying to avoid a decrease in the biopotency of the biologically active material or denaturation of the material is described in Swedish patent application 7902104-4, where bacteria are encapsulated in for example fats or the like. The material thus encapsulated, for example admixed to animal food, withstands for instance pelletizing better than materials not being encapsulated.

One way of avoiding the problem of denaturation should be to supply biologically active material to a processed feed or foodstuff, i.e. to the base material. However, such a process involves considerable technical difficulties. For instance, one difficulty may be that the biologically active material, the amount of which is small relative to the base material, cannot be evenly distributed therein. Another problem is that the even admixture is not very likely to remain homogeneous, even if one should be successful in mixing a small amount of biological material homogeneously with a large amount of base material, but with all probability the material will be stratified in a subsequent handling. Still a problem in connection with an admixture of biologically active material in foodstuffs or animal food is the known phenomenon of friction between the particles to be homogenized. A slow and careful homogenization usually results in a bad homogenity while an efficient homogenization destroys biologically active material completely or partly.

One method of reducing the risks of a similar reduction of the bioactivity is using for example encapsulated material, as mentioned above. However, the homogenity problem cannot be solved by this method, particularly not as the density and the particles size of the materials to be mixed differ from each other.

A way of solving the problem with a homogeneous and constant admixture of material in for example seed is described in Swedish application No. 7904283-4, where a finely divided material to be supplied to seed or grain for instance is mixed with e.g. oil or fat to form a paste which is sorbed by the seed. However, the method implies synergistic components of the mixture with respect to sorption of the seed; moreover, relatively large amounts of additives are required for a homogeneous admixture.

As certain biologically active materials are active also in amounts of the order of parts per million, the method is not useable for supply of such materials. Another disadvantage of the method is that the carrier used together with finely divided material is supplied in small amounts which, therefore, cannot possibly protect biologically active materials from physical and chemical effects or contribute to a homogeneous admixture, especially as small amounts of active material are to be bonded to the seed.

Certain biologically active materials are sensitive to moisture. Examples of this are certain freeze-dried bacteria concentrates. As one has recently started to use living bacteria for admixture in for example dry feed or dry foodstuff an increased demand is made on the stability of these active materials against for instance moisture. One way of increasing the resistance to moisture of the active material, e.g. the moisture resistance of freeze-dried bacteria, is for instance described in CH A 525 957, according to which a freeze-dried bacteria mass is mixed with oils or fats to form a paste which will then have a certain protection.

However, it is known that a homogeneous admixture of such a paste in feed or foodstuff implies a relatively large amount of bacteria paste, probably 5-10% or more. Otherwise the homogenization must be so effective that the survival of the bacteria is put at risk while the structural properties of the material can be changed.

It is apparent from the above-mentioned description of prior art that none of the methods described therein is suitable to utilize when it is desired to add small amounts of biologically active materials to base materials, i.e. processed feed or foodstuffs, in such a way that the biologically active material is distributed homogeneously, on the one hand, and the active material, on the other hand, is protected at the same time against mechanical and other physical strains such as mixture, transport and storage.

SUMMARY OF THE INVENTION

Accordingly this invention relates to a process for supply of low concentrations of biologically active materials to base material such as processed foodstuff and feed, and the process has been given the characteristic features apparent from claim 1.

DETAILED DESCRIPTION OF THE INVENTION

In accordance with a preferred embodiment of the invention the biologically active material is present in a solid and finely divided form and the carrier is a liquid, which has a polarity opposite to that of the solid biologically active material (i.e. a system having hydrophilic-hydrophobic properties). This means that if the biological material is hydrophilic, i.e. polar, the carrier must be hydrophobic, or nonpolar.

The reason for this is that many materials such as biologically active materials, for instance enzymes, freeze-dried bacteria, etc. are easily denaturated in a hydrophilic environment, for example when these are admixed in water; this is especially the case when water solutions of such materials are dried e.g. at room temperature. Such a negative side-effect can be avoided by the above-mentioned opposite polar-nonpolar relation between the solid biological material and the liquid carrier.

In such a case the carrier gives several other positive qualities in connection with its use. It is possible to admix homogeneously also very small amounts of biologically active material in a base material, on the one hand, and, on the other hand, the carrier serves as a friction reducing agent in admixture and transport. Moreover, it is avoided that the properties of the active material are influenced by the carrier. Besides, the carrier serves as an adhesive material contributing to the active material being retained on the surface of the processed product. If the carrier is an oil it functions as a tacky binder. If, for instance, it consists of water or some other polar substance a small amount of for example sugar or the like is dissolved from the feed or foodstuff which, then, adheres to the added material on the surface of the particles.

The very supply technique is known per se and is for instance utilized in coating of a processed material with e.g. an aromatic or dye which, however, must be quite dissolved in the liquid carrier according to usual technique. However, this demand is not only quite unnecessary according to the invention but even a clear disadvantage in biologically active materials, the properties of which are influenced negatively by the liquid carrier if the material should be dissolved therein.

The invention will now be illustrated with the following non-limiting example.

EXAMPLE 10 g of a biological material, enzyme or freeze-dried bacteria, the properties of which are hydrophilic (polar), are mixed homogeneously with 1,000 ml of a hydrophobic liquid, for instance oil, to form a suspension. This suspension is added to 1,000 kg of feed or foodstuff pelletized, extruded or treated in another way, by means of a membrane pump, the suspension being pumped through an atomizing nozzle. The suspension which is finely divided in the nozzle to very small particles is led to the processed material e.g. in a chamber or a transport pipe which is provided with a device mixing and holding the material until this has been mixed homogeneously with the finely divided suspension.

In accordance with the above example 10 ppm of a biologically active material can thus be supplied to the base material, i.e. the processed foodstuff or feed, with the following unexpected results;
the biologically active material is mixed homogeneously with the base material and is evenly distributed on the latter's surface,
negative friction effects in dosage and admixture are eliminated,
the added biological material is retained on the surface of the base material through the action of the carrier.

It is apparent from this example that so small amounts as of the order of parts per million of a biologically active material can be added efficiently and gently to a processed animal food or foodstuff without the properties or the biologicl activity of the biologically active material being injuriously influenced.

Thanks to these circumstances the invention will have a great economical and technical importance in modern production of animal food and/or foodstuffs.

We claim:

1. A process for supplying low concentrations, of the order of parts per million, of biologically active materials to base materials comprising: (a) forming a slurry of said biologically active material and an inert liquid carrier, said carrier being of opposite polarity to said biologically active material, (b) blending said slurry to form a homogeneous suspension in which said suspended biologically active material is evenly distributed throughout said carrier, and (c) applying said suspension to said base material by atomizing said suspension and supplying the thus atomized particles of the suspension to the base material so that the surface of said material is evenly coated by said suspension.

2. The process of claim 1, wherein said biologically active material is present in a solid, finely divided form.

3. The process of claim 1, wherein the biologically active material is selected from the group consisting of enzymes, hormones, vitamins, living bacteria or parts thereof, or mixtures of these.

4. The process of claim 1, 2, or 3, wherein the carrier is one preferred by humans and animals.

5. The process of claim 1, wherein said concentration of active materials is about 10 parts active material per million parts base material.

6. The process of claim 1, wherein said carrier is a carrier which protects said active material from detrimental physical and chemical influences.

7. The process of claim 1, wherein said base materials comprise processed food stuff or animal food.

8. A process of combining a foodstuff with a low concentration of the order of parts per million, of a biologically active material without substantially affecting the properties of the biologically active material, said process comprising:
forming a suspension of a biologically active material by mixing particles of said material with a liquid carrier having a polarity opposite that of the biologically active material, and
combining said suspension with a foodstuff by atomizing said suspension and supplying the thus atomized particles of the suspension to the foodstuff so that the atomized particles are uniformly distributed on the surface of the foodstuff and the properties of the biologically active material are substantially unaffected, the suspension being combined with the foodstuff in an amount and concentration so that the concentration of the biologically active material relative to the foodstuff is of the order of parts per million.

9. The process of claim 8 wherein said biologically active material is selected from the group consisting of enzymes, hormones, vitamins, living bacteria or parts thereof, or mixtures of these.

10. The process of claim 8 wherein the foodstuff is for humans and animals.

11. The process of claim 8 wherein the concentration of biologically active material to foodstuff is 10 ppm.

12. The process of claim 8 wherein said carrier is an adhesive and the suspension is combined with the foodstuff by adhering the atomized particles of the suspension on the surface of the foodstuff.

* * * * *